Figure 1:
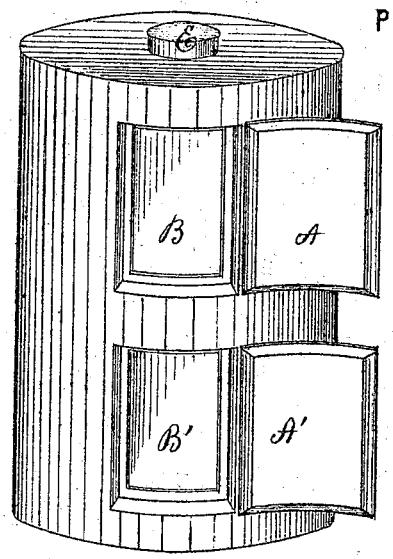

JOSEPH F. DICK.

Improvement in Refrigerators.

No. 121,280.

Patented Nov. 28, 1871.

Witnesses.
H. N. Jenkins
L. J. Olmstead

Inventor.
J. F. Dick

UNITED STATES PATENT OFFICE.

JOSEPH F. DICK, OF NEW ORLEANS, LOUISIANA.

IMPROVEMENT IN REFRIGERATORS.

Specification forming part of Letters Patent No. 121,280, dated November 28, 1871.

*To all whom it may concern:*

Be it known that I, JOSEPH F. DICK, of the city of New Orleans and State of Louisiana, have invented a new, useful, and Improved Refrigerator; and I hereby declare the following to be a full, clear, and exact description of the same, reference being had to the annexed drawing constituting a part of this specification, and whereon all that I claim as pertaining to my invention is clearly and plainly exhibited.

My improvement, as illustrated in said drawing, involves an ordinary upright cylindrical refrigerator, having within its interior chamber a vertical cylindrical revolving ice-receptacle, from the outer perimeter of which projects a series of arms, pins, or hooks, upon which it is designed to suspend the fish, meat, game, fruit, vegetables, or other substances to be preserved. The exterior casing or shell of the refrigerator is furthermore provided with one or more glass openings, through which the substances to be preserved may be examined by persons intending to purchase them without the necessity of removing said glass openings, and thereby exposing them to the perishable action of the outer atmosphere. The glass openings above mentioned are furthermore inclosed by double-cased doors, filled with some non-conducting material similar to that which may be employed in the other parts of the outer casing of the refrigerator. The refrigerator herein partially described is intended to be employed more especially in markets during the warm season of the year, and for this purpose to be thoroughly efficient in the preservation of all substances or products which are perishable by exposure to a warm or tropical climate.

For a better understanding of my invention reference must now be made to the drawing annexed, on which—

Figure 2:
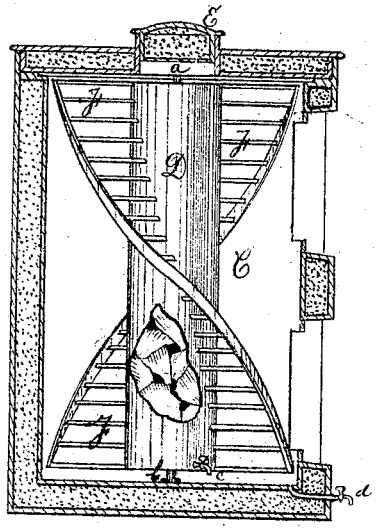

Figure 1 is a perspective view of my refrigerator. Fig. 2 is a vertical section of the outer casing thereof, exhibiting likewise the interior cylindrical revolving ice-receptacle before mentioned. A portion of the said receptacle is shown broken away to expose to view the ice therein placed.

In Fig. 1 the refrigerator is shown with the outer doors A A' and inner glass doors B B' communicating with the interior chamber C, in which is placed the aforesaid ice-receptacle D, in the upper end of which there is a cover, E, which can be easily removed whenever it is required to replenish the said receptacle with the ice or other freezing mixture which may be employed to produce the desired temperature within the chamber of the refrigerator. F are the pins, arms, or hooks, before mentioned, upon which may be suspended the substances or products to be preserved. The revolving ice-receptacle D, it will be perceived, is stepped within the chamber C at the journals $a$ and $b$ upon which it is made freely to revolve, to the end of bringing to view at the glass openings the products thereon suspended. The said ice-receptacle D is provided, moreover, with the stop-cock $c$ and the refrigerator proper with the stop-cock $d$, both of which subserve the important purpose of withdrawing from the chambers with which they respectively communicate any water which, from the melting of the ice, may therein accumulate. The outer casing or shell G of the refrigerator is, like all other refrigerators, made double, and the intermediate space thereof filled with any suitable non-conducting material or substance usually employed for the purposes of excluding the heat from, and of retaining the cold within, the interior chamber C.

I have described my refrigerator as being cylindrical; but I wish to reserve herein the privilege of adopting any other forms of construction which, in practice, I may deem most expedient.

Having described my invention, what I desire to secure by Letters Patent is the following claim:

The refrigerator herein described, having one or more glass openings, B and B', and the interior revolving ice-receptacle D, with arms, pins, or hooks F, substantially as described, for the purposes set forth.

J. F. DICK.

Witnesses:
H. N. JENKINS,
L. J. OLMSTEAD.

(58)